United States Patent
Arefi et al.

(10) Patent No.: US 9,039,081 B2
(45) Date of Patent: May 26, 2015

(54) WIRE HARNESS FOR A VEHICLE SEATING ASSEMBLY

(75) Inventors: Majid Arefi, West Bloomfield, MI (US);
Michael Medoro, Northville, MI (US);
Khaled Ayyash, Ann Arbor, MI (US);
Curtis D. Stanhope, Pinckney, MI (US);
Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 13/542,427

(22) Filed: Jul. 5, 2012

(65) Prior Publication Data

US 2013/0119726 A1 May 16, 2013

Related U.S. Application Data

(60) Provisional application No. 61/559,390, filed on Nov. 14, 2011.

(51) Int. Cl.
| | | |
|---|---|---|
| *A47C 7/62* | (2006.01) | |
| *B60N 2/68* | (2006.01) | |
| *B60N 2/72* | (2006.01) | |
| *B60N 2/56* | (2006.01) | |
| *B60N 2/42* | (2006.01) | |
| *B60R 11/00* | (2006.01) | |
| *B60N 2/44* | (2006.01) | |
| *B60R 11/02* | (2006.01) | |

(52) U.S. Cl.
CPC . *B60N 2/68* (2013.01); *B60R 11/00* (2013.01); *B60N 2/44* (2013.01); *B60R 2011/0288* (2013.01); *B60R 11/0264* (2013.01); *B60R 2011/0012* (2013.01); *B60N 2/686* (2013.01); *B60N 2/72* (2013.01); *B60N 2/5621* (2013.01); *B60N 2/682* (2013.01); *B60N 2/4228* (2013.01)

(58) Field of Classification Search
USPC .................................. 297/188.08, 188.12
See application file for complete search history.

(56) References Cited

U.S. PATENT DOCUMENTS

| | | | | |
|---|---|---|---|---|
| 4,530,541 | A * | 7/1985 | Resag et al. | 297/452.18 |
| 4,844,533 | A * | 7/1989 | Dowd et al. | 296/214 |
| 4,969,687 | A | 11/1990 | Higuchi et al. | |
| 5,269,060 | A * | 12/1993 | Dowd et al. | 29/897.2 |
| 5,284,381 | A | 2/1994 | Aoki et al. | |
| 5,315,798 | A * | 5/1994 | Zarwell | 52/202 |
| 5,326,155 | A * | 7/1994 | Wild | 297/452.38 |
| 5,836,645 | A * | 11/1998 | Sakaue et al. | 297/68 |
| 5,879,055 | A * | 3/1999 | Dishner et al. | 297/452.38 |
| 6,234,518 | B1 * | 5/2001 | Ryl et al. | 280/730.2 |
| 6,412,874 | B1 | 7/2002 | Mayer | |
| 6,429,544 | B1 * | 8/2002 | Sasaki et al. | 307/10.1 |
| 6,481,179 | B2 * | 11/2002 | Zen | 52/784.13 |

(Continued)

FOREIGN PATENT DOCUMENTS

| | | |
|---|---|---|
| DE | 19943890 C1 | 2/2001 |
| DE | 10080343 T1 | 5/2001 |

(Continued)

*Primary Examiner* — David E Allred
(74) *Attorney, Agent, or Firm* — Vichit Chea; Price Heneveld LLP

(57) ABSTRACT

A wire harness for a vehicle seating assembly includes a body portion having a plurality of engagement hooks adapted for engagement with a vehicle seat cushion pan. A latticework of interconnected lateral support members are bound by a peripheral frame.

16 Claims, 11 Drawing Sheets

(56) References Cited

U.S. PATENT DOCUMENTS

| | | |
|---|---|---|
| 6,704,974 B2 | 3/2004 | Lackler |
| 7,036,864 B2 | 5/2006 | Rehfuss et al. |
| 7,063,368 B2 * | 6/2006 | Kayumi ................. 296/65.05 |
| 7,182,383 B2 * | 2/2007 | Anderson et al. ........... 296/37.8 |
| 7,331,635 B2 | 2/2008 | Schwarz et al. |
| 7,390,063 B2 | 6/2008 | Behrens |
| 7,537,283 B2 | 5/2009 | Niitsuma et al. |
| 7,769,346 B1 * | 8/2010 | Van Order et al. ........... 455/41.2 |
| 7,775,603 B2 | 8/2010 | Mundell et al. |
| 7,794,021 B2 | 9/2010 | Sahashi |
| 7,850,247 B2 | 12/2010 | Stauske et al. |
| 8,075,054 B2 * | 12/2011 | Smith ..................... 297/217.3 |
| 8,282,164 B2 * | 10/2012 | Galbreath et al. ......... 297/217.3 |
| 8,665,103 B2 * | 3/2014 | Hayakawa et al. ........... 340/667 |
| 2001/0003889 A1 * | 6/2001 | Zen ............................. 52/784.1 |
| 2002/0050730 A1 * | 5/2002 | Kondo et al. ............. 297/217.3 |
| 2005/0017564 A1 * | 1/2005 | Kayumi ..................... 297/378.1 |
| 2005/0168041 A1 | 8/2005 | Glance et al. |
| 2005/0225057 A1 * | 10/2005 | Yamamoto et al. ........... 280/727 |
| 2006/0138812 A1 * | 6/2006 | Aoki ........................ 297/180.14 |
| 2007/0252423 A1 * | 11/2007 | Schulz et al. ............ 297/452.38 |
| 2008/0143152 A1 * | 6/2008 | Wolas ...................... 297/180.14 |
| 2009/0001775 A1 * | 1/2009 | Smith ............................ 297/135 |
| 2009/0008970 A1 * | 1/2009 | Flory et al. ............... 297/180.14 |
| 2009/0015043 A1 | 1/2009 | Macht et al. |
| 2010/0001560 A1 | 1/2010 | Gross et al. |
| 2010/0207773 A1 * | 8/2010 | Hayakawa et al. ........... 340/667 |
| 2010/0219674 A1 | 9/2010 | Sakkinen et al. |
| 2013/0119715 A1 | 5/2013 | Medoro et al. |
| 2013/0119720 A1 | 5/2013 | Dixon et al. |
| 2013/0119741 A1 | 5/2013 | Medoro et al. |

FOREIGN PATENT DOCUMENTS

| | | |
|---|---|---|
| DE | 10112918 A1 | 10/2001 |
| DE | 20307185 U1 | 7/2003 |
| DE | 102010042880 A1 | 5/2012 |
| DE | 102012103919 A1 | 4/2013 |
| DE | 102012220225 A1 | 5/2013 |
| DE | 102012220227 A1 | 5/2013 |
| DE | 102012220229 A1 | 5/2013 |
| DE | 102012220621 A1 | 5/2013 |
| EP | 0709249 A2 | 5/1996 |
| EP | 1593547 A1 | 11/2005 |
| JP | 2009248676 A | 10/2009 |
| JP | 2010259685 A | 11/2010 |
| WO | 2006003167 A1 | 1/2006 |
| WO | 2006093644 A1 | 9/2006 |
| WO | 2008017794 A2 | 2/2008 |
| WO | 2011124472 A1 | 10/2011 |

* cited by examiner

WIRE HARNESS FOR A VEHICLE SEATING ASSEMBLY

CROSS-REFERENCE TO RELATED APPLICATION

This application claims priority to and the benefit under 35 U.S.C. §119(e) of U.S. Provisional Patent Application No. 61/559,390, filed on Nov. 14, 2011, entitled "VEHICLE SEATING ASSEMBLY," the entire disclosure of which is hereby incorporated herein by reference.

FIELD OF THE INVENTION

The present invention generally relates to a wire harness, and more specifically, to a wire harness for a vehicle seating assembly.

BACKGROUND OF THE INVENTION

Traditional vehicle seating assemblies are often constructed based on size constraints of an interior cabin, as well as meeting design requirements. The present invention provides a robust seating arrangement using minimal material, and at the same time provides safer seat components that aid in protecting a passenger during a collision event, expedites the time to manufacture the seat, and lessens the possibility of injury to a manufacturer during installation.

SUMMARY OF THE INVENTION

According to one aspect of the present invention, a wire harness for a vehicle seating assembly includes a body portion including a plurality of upwardly extending engagement hooks configured for engagement with a vehicle seat cushion pan. A latticework of interconnected lateral support members are bound by a peripheral frame. A plurality of module engagement tabs extend downwardly from the peripheral frame and are adapted to secure one or more vehicle seating assembly modules.

According to another aspect of the present invention, a wire harness for a vehicle seating assembly includes a body portion having a plurality of engagement hooks adapted for engagement with a vehicle seat cushion pan. A latticework of interconnected lateral support members are bound by a peripheral frame.

According to another aspect of the present invention, a forward support for a vehicle seating assembly includes a cushion pan having a recessed bottom portion adapted to secure a wiring harness. The wiring harness includes a body portion having a plurality of engagement hooks adapted for engagement with the cushion pan. A latticework of interconnected lateral support members are bound by a peripheral frame.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
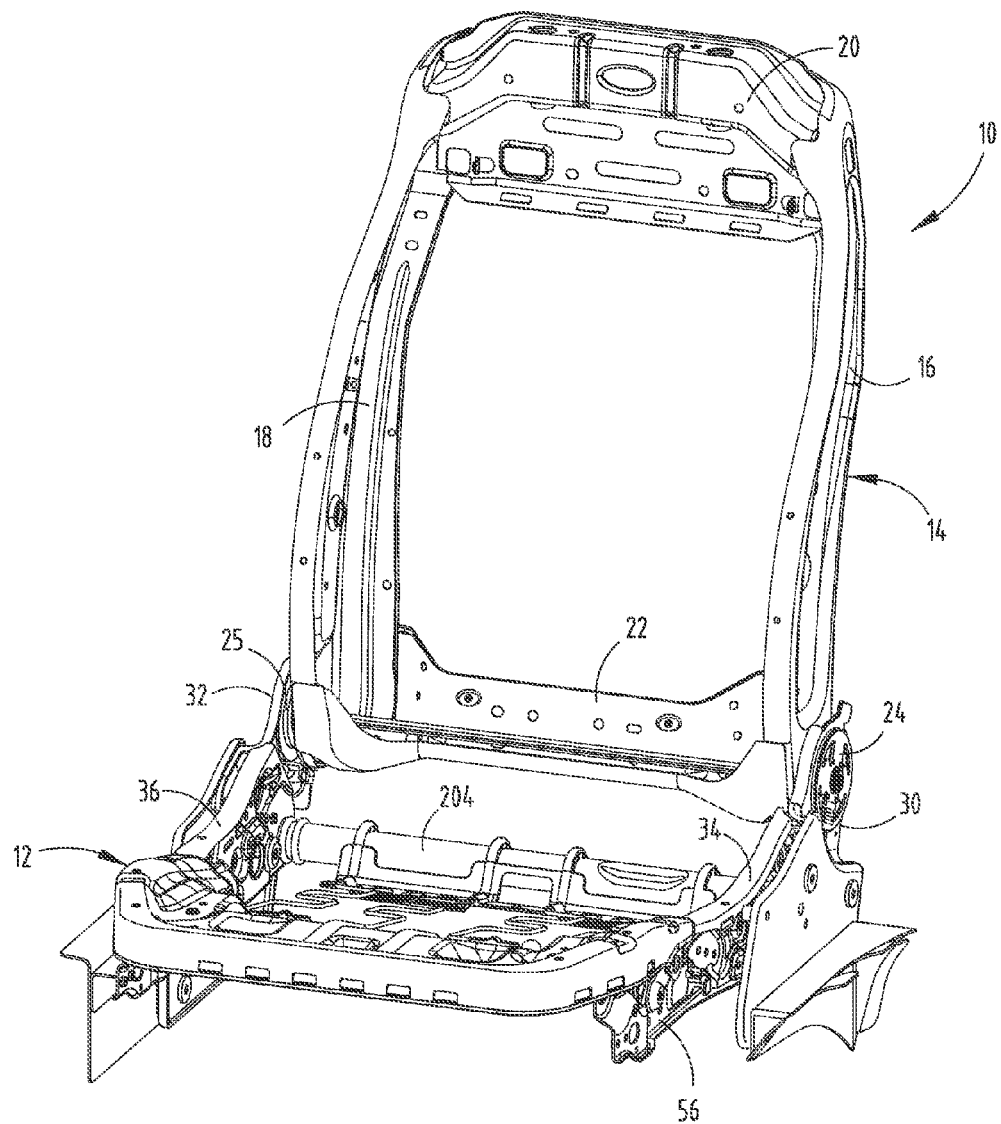
FIG. 1 is a top perspective view of one embodiment of a vehicle seating assembly of the present invention.
Figure 2:
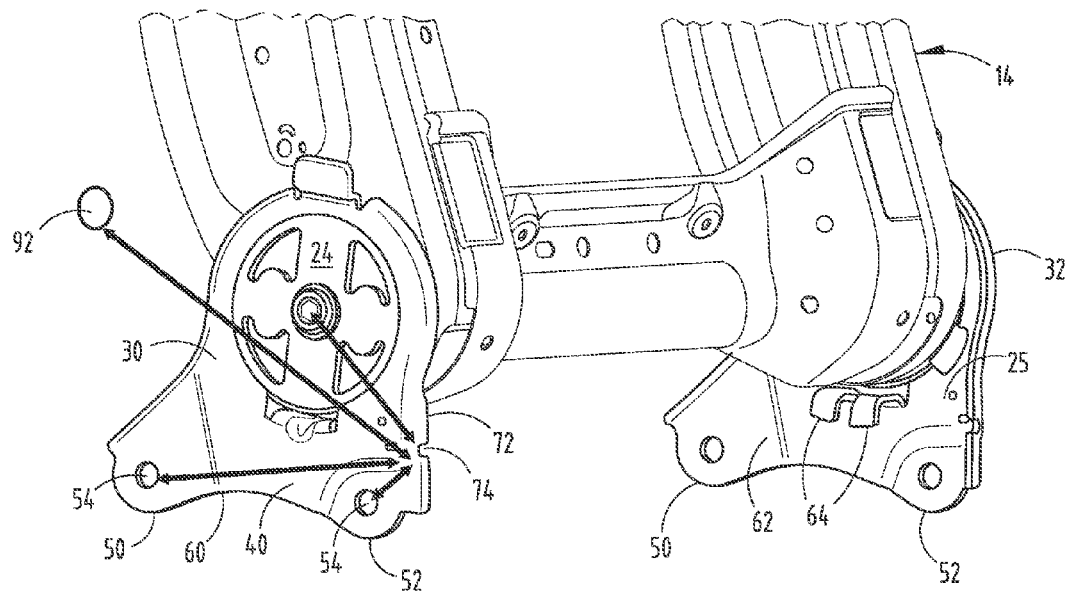
FIG. 2 is a top perspective view of a portion of the seating assembly of FIG. 1.
Figure 3:
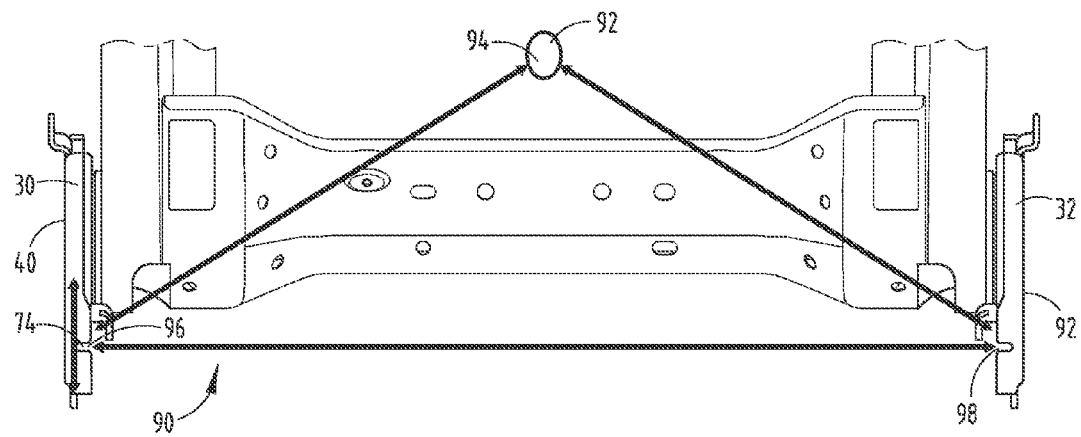
FIG. 3 is a rear elevational view of a portion of the vehicle seating assembly of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment generally illustrated in FIG. 1, the reference numeral 10 generally designates a vehicle seating assembly that includes a seat 12 and a seat back 14 and is configured for use in a vehicle. The seat back 14 includes first and second side members 16, 18 separated by a top support member 20 and a bottom support member 22. The seat back 14 includes first and second recliner hearts 24, 25 about which the seat back 14 pivots relative to the seat 12. The recliner hearts 24, 25 are received in first and second recliner brackets 30, 32 that support the seat back 14 and serve as the interface between the seat back 14 and first and second side supports 34, 36 of the seat 12.

Referring now to the embodiment generally illustrated in FIGS. 1-5, the first and second recliner brackets 30, 32, when used in conjunction with the vehicle seating assembly 10, generally define a recliner bracket assembly. It will be noted that the first recliner bracket 30, or left recliner bracket, is a mirror image of the second recliner bracket 32, or right recliner bracket. For purposes of clarity, only the left recliner bracket 30 is discussed in detail below. However, one having ordinary skill in the art will understand that the right recliner bracket 32 is a mirror image of the left recliner bracket 30, and that all features and functions of the right recliner bracket 32 are identical to the left recliner bracket 30.

Figure 4:
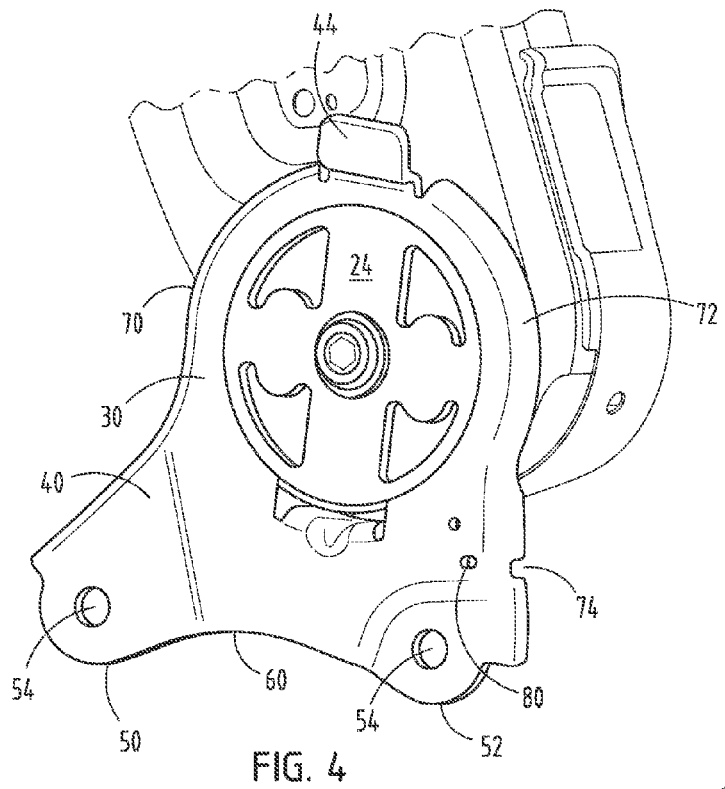
FIG. 4 is a top perspective view of one embodiment of a recliner bracket engaged with a recliner heart.
Figure 5:
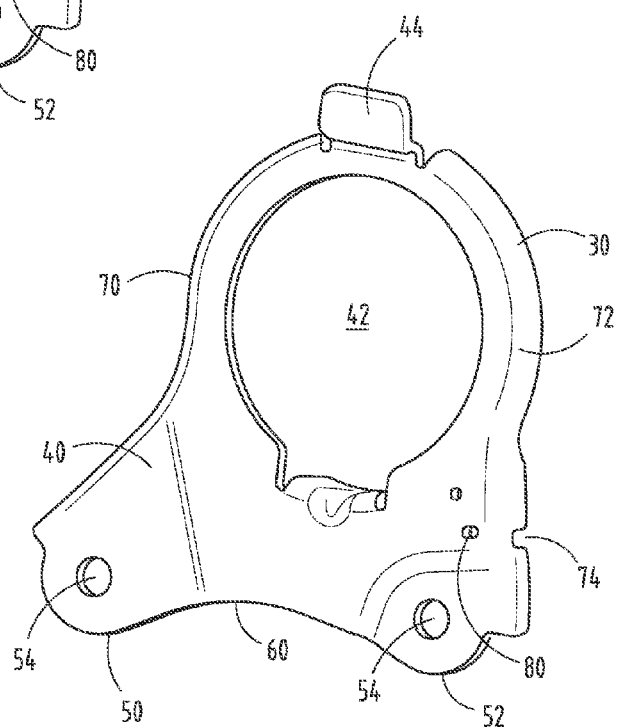
FIG. 5 is a top perspective view of a recliner bracket prior to installation.
Figure 6:
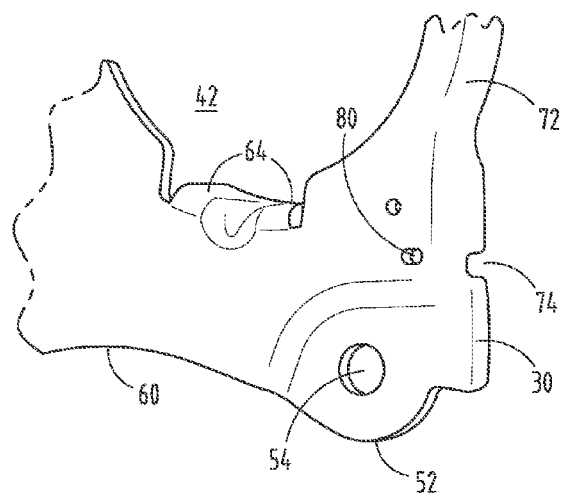
FIG. 6 is a top perspective view of a portion of the recliner bracket of FIG. 5.
Figure 7:
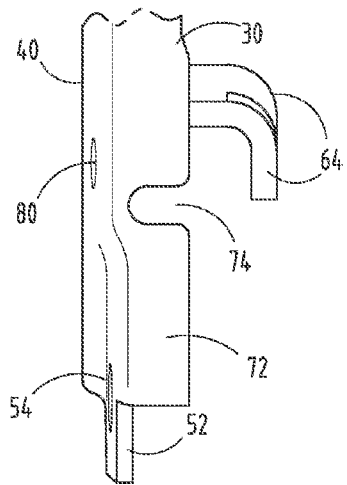
FIG. 7 is a rear elevational view of the recliner bracket of FIG. 5.
Figure 8:
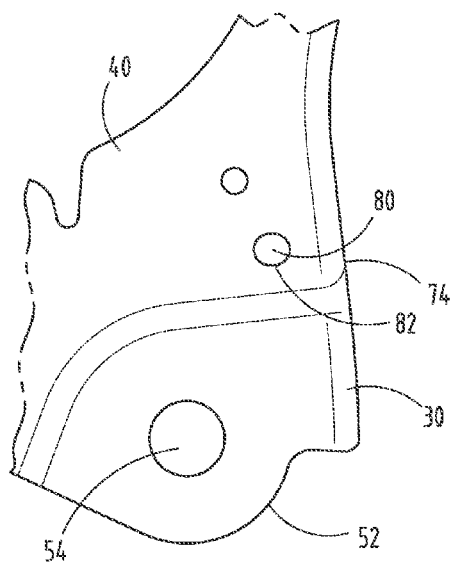
FIG. 8 is a side elevational view of a portion of the recliner bracket of FIG. 5.

Referring again to FIGS. 1-5, the recliner bracket 30 includes a web 40 that defines a recliner heart receiving aperture 42. As previously mentioned, the recliner heart 24 is operably connected with both the first side support 34 of the vehicle seating assembly 10 and the recliner bracket 30. A stop flange 44 is positioned above the recliner heart receiving aperture 42. The recliner bracket 30 also includes forward and rearward seat support connection tabs 50, 52 that include mechanical fastener apertures 54 adapted to engage a side support 56 of the seat 12. The planar extent of the rearward seat support connection tab 52 is offset from the planar extent of the web 40 of the recliner bracket 30. More specifically, the rearward seat support connection tab 52 is offset inwardly to a position closer to the center of the vehicle seating assembly 10. The recliner bracket 30 includes an arcuate lower portion 60 between the forward seat support connection tab 50 and the rearward seat support connection tab 52. In addition, an inside wall 62 of the web 40 includes downwardly turned hooks 64 adapted to secure trim components or other modules below the recliner heart receiving aperture 42 of the recliner bracket 30. The web 40 also includes a front flange 70 and a rear flange 72. The rear flange 72 of the web 40 includes a deformation notch 74, as illustrated in FIG. 4. The deformation notch 74 is generally adapted to collapse under a predetermined loading condition associated with a rear collision event. Stated differently, when the vehicle has been struck from the rear, the loading forces expressed on the seat 12 in a rearward direction, if substantial enough, will cause the deformation notch 74 to collapse or crush downward in a controlled manner, thus minimizing abrasive impact to a passenger and helping the vehicle seating assembly 10 to cradle the passenger. As illustrated, the deformation notch 74 is disposed in the rear flange 72, such that a midportion of the deformation notch 74 is directly laterally aligned with the web 40 as it begins to transition inwardly to the offset portion that generally defines the rearward seat support connection tab 52 (FIG. 7).

Referring now to FIGS. 4-8, the recliner bracket 30 also includes a deformation aperture 80. The deformation aperture 80 is disposed in the planar extent of the web 40 forward of the deformation notch 74. The deformation aperture 80 is also disposed slightly above the deformation notch 74, such that a bottom edge 82 of the deformation aperture 80 is tangential with a line that generally defines the transition of the web 40 as it begins to curve inwardly to the offset portion that generally defines the rearward seat support connection tab 52. Together, the deformation aperture 80 and deformation notch 74 provide controlled deformation of the vehicle seating assembly 10 as a result of applied forces in a rearward direction generally associated with a rear impact collision event and the loads distributed by a passenger on the vehicle seating assembly 10.

Referring again to FIGS. 2-8, and as specifically shown in FIG. 3, the left and right recliner brackets 30, 32, and the recliner bracket assembly generally, define a deformation triangle 90, wherein an H-point 92, or hip point, of a passenger serves as one apex 94, the deformation notch 74 of the left recliner bracket 30 serves as a second apex 96, and the deformation notch 74 of the right recliner bracket 32 serves as a third apex 98. The deformation triangle 90 is generally an isosceles triangle that allows for controlled deformation based on the passenger H-point 92, the recliner pivot, and the recliner bracket 30 attachment points. Traditional recliner brackets used to attach recliner mechanisms to seat cushion structures are relatively stiff and have limited deflection and yielding that occur from loading. Consequently, the back frame side members must sustain higher loads. The energy management features discussed above with respect to the disclosed recliner brackets 30, 32 enable the seat back 14 and the first and second side supports 34, 36 to be optimized for both gauge and section geometry because the recliner brackets 30, 32 reduce the required load-bearing capacity.

Figure 9:
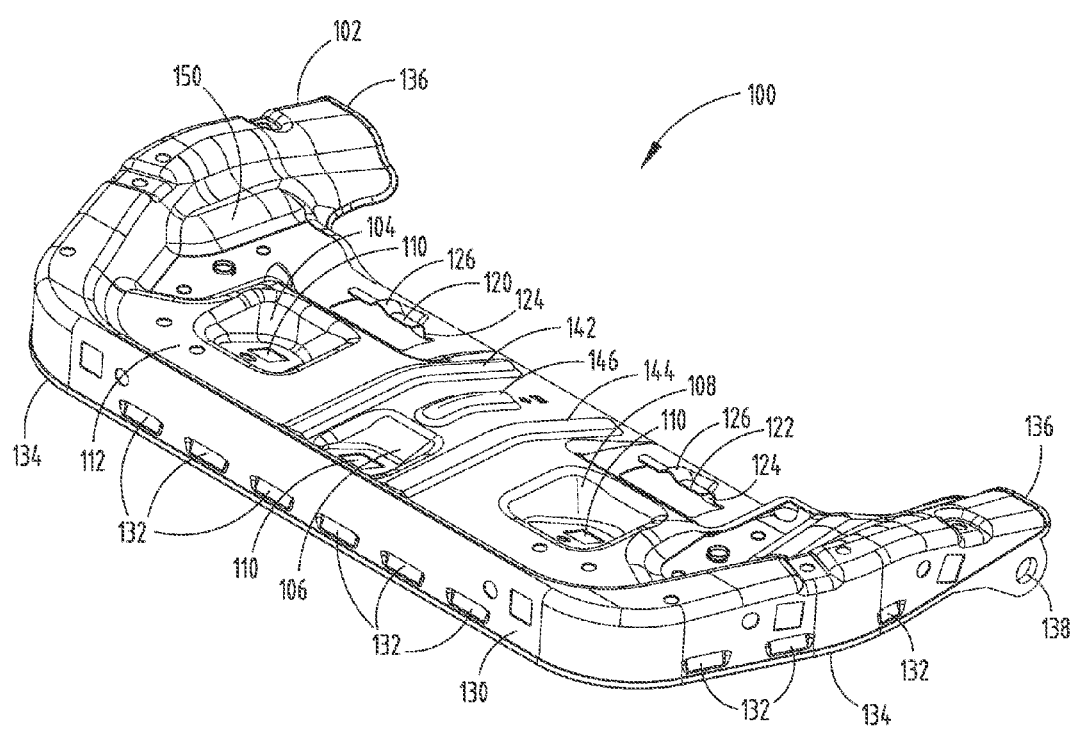
FIG. 9 is a top perspective view of one embodiment of a cushion pan of the present invention.
Figure 10:
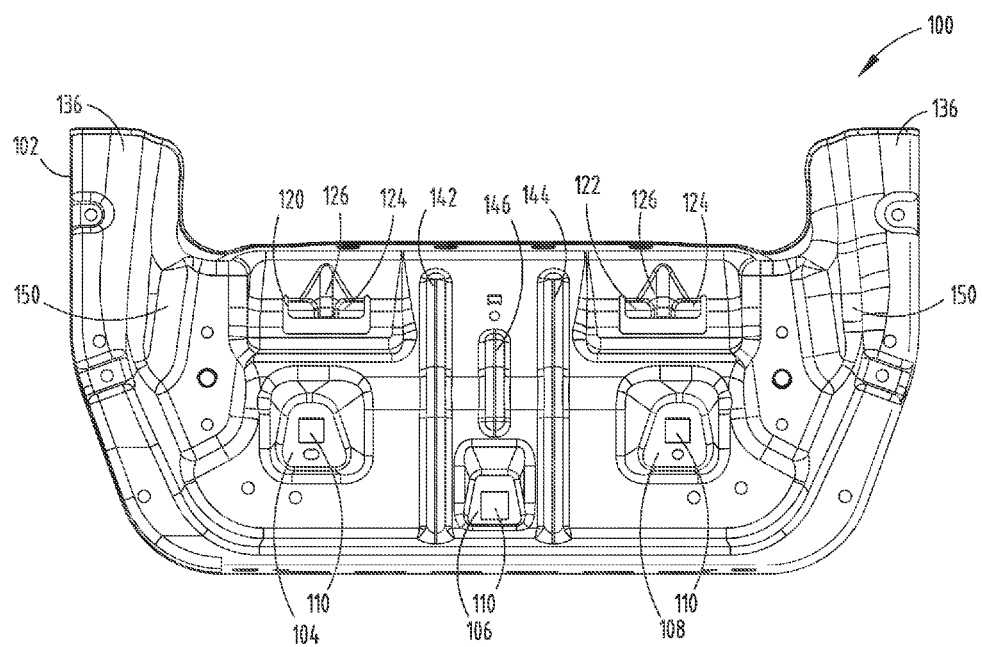
FIG. 10 is a top plan view of the cushion pan of FIG. 9.
Figure 11:
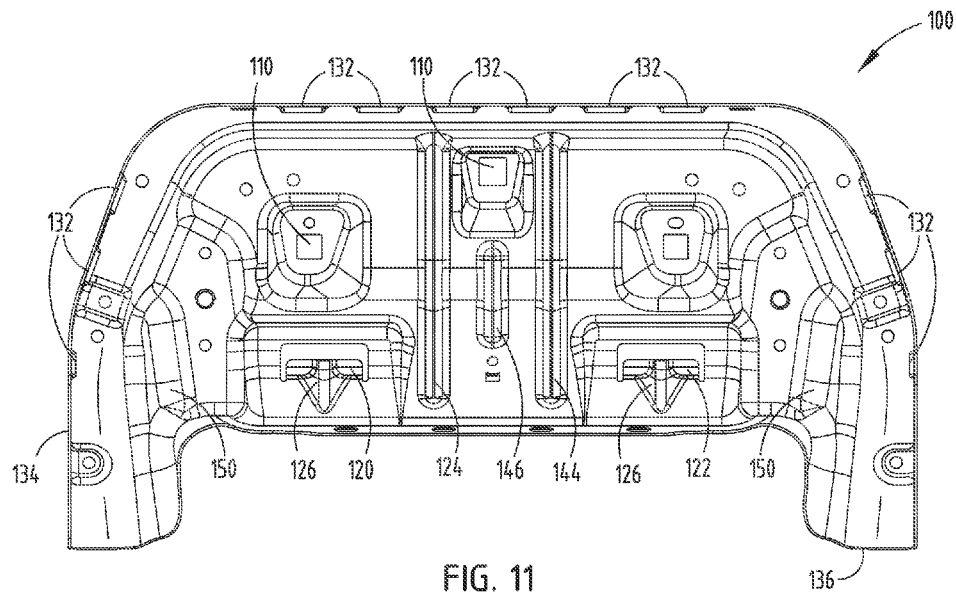
FIG. 11 is a bottom plan view of the cushion pan of FIG. 9.

Referring now to FIGS. 9-11, an embodiment of a cushion pan 100 for the vehicle seating assembly 10 is generally disclosed. The cushion pan 100 includes a body portion 102 having a first side pocket 104, a center pocket 106, and a second side pocket 108 that include a module retention aperture 110. In the illustrated embodiment of FIGS. 9-11, each of the module retention apertures 110 are recessed in one of the pockets 104, 106, 108, such that retention hooks of a wire harness that extend into the module retention apertures 110 do not extend above a top wall 112 of the cushion pan 100. Accordingly, the retention hooks do not contact any cushions of the vehicle seating assembly 10, thus limiting damage to the cushion, and also eliminating, or at least minimizing, any feel of the retention hooks by a passenger seated on the cushion pan 100. In addition, the cushion pan 100 includes first and second suspension assembly retainers 120, 122 that are disposed in the body portion 102. The first and second suspension assembly retainers 120, 122 include an upwardly turned flange 124 having an arcuate slot 126 disposed substantially essentially in the flange 124. The arcuate slot 126 is complementary in construction to an arcuate wedge disposed on the vehicle seat suspension assembly, as outlined in further detail herein.

Referring again to FIGS. 9-11, the cushion pan 100 also includes a peripheral flange 130 that extends substantially orthogonal to the top wall 112 and to the planar extent of the body portion 102 generally. The peripheral flange 130 includes a plurality of trim tabs 132. The trim tabs 132 are designed to engage with a seat trim that covers the vehicle seating assembly 10. A bottom portion of the peripheral flange 130 includes a peripheral edge 134. The peripheral edge 134 is hemmed about a substantial portion of the peripheral edge 134. The hemmed portion of the peripheral edge 134 forms a generally blunt contact surface with few or no sharp edges, thereby reducing the possibility of injury to a manufacturer during installation. In addition, the hemmed edge minimizes the likelihood that a sharp edge will project through the seat trim. The cushion pan 100 includes rearwardly extending pivot arms 136 that have a pivot pin receiving aperture 138. Consequently, the cushion pan 100 can be rotated between raised and lowered positions to provide additional support to the legs of a passenger.

Referring once again to FIGS. 9-11, the body portion 102 of the cushion pan 100 includes a web that has an approximate thickness of 0.7 millimeters. The midportion of the cushion pan 100 includes first and second support ribs 142, 144 that extend from a forward portion of the body portion 102 to a rearward portion of the body portion 102. The first and second support ribs 142, 144 provide additional strength to the cushion pan 100, which allows for the cushion pan 100 to maintain an approximate thickness of 0.7 millimeters. In addition, a third support rib 146 is disposed between the first and second support ribs 142, 144 substantially parallel thereto. However, the third support rib 146 does not extend all the way from the forward portion of the body portion 102 to the rearward portion of the body portion 102. Rather, the third support rib 146 extends from the central pocket 106 in the body portion 102 and does not extend as far rearwardly as the first and second support ribs 142, 144. The central pocket 106 of the body portion 102 is positioned forward relative to the first and second side pockets 104, 108 in the body portion 102. The cushion pan 100 also includes a multitude of apertures adapted for engagement with a module bracket, wire harness, etc. Rounded areas 150 adjacent to each of the rearwardly extending pivot arms 136 provide additional support to the body portion 102, thereby increasing rigidity of the cushion pan 100.

The cushion pan 100 generally includes a multitude of rounded edges, such that sharp corners and sharp edges are substantially eliminated from the overall construction. This configuration provides for added comfort to passengers, as well as additional safety to the manufacturer during the installation process. The cushion pan 100 is generally designed and configured to handle the stresses and loadings associated with the weight of a passenger during transportation of the passenger from one locale to another. The lanced trim tab geometries are designed to interface with the trim in a secure way. Further, retention features are disposed throughout the body portion 102 of the cushion pan 100 and are strategically positioned to provide robust attachment of occupant classification systems, as well as multi-contour seat mechanisms. The retention features also include error-proofing methodology to prevent incorrect assembly during installation. The pockets 104, 106, 108 are designed to provide retention features for the plastic module bracket and eliminate buzz, squeak, and rattle concerns. Furthermore, the cushion pan 100 is designed for both power and manual seating assemblies. Further, the cushion pan 100 is designed for both driver and passenger side seats, thereby minimizing production tool complexity. Moreover, the cushion pan 100 perimeter profile is optimized to provide clearance to center console features in an interior cabin of a vehicle.

Figure 12:
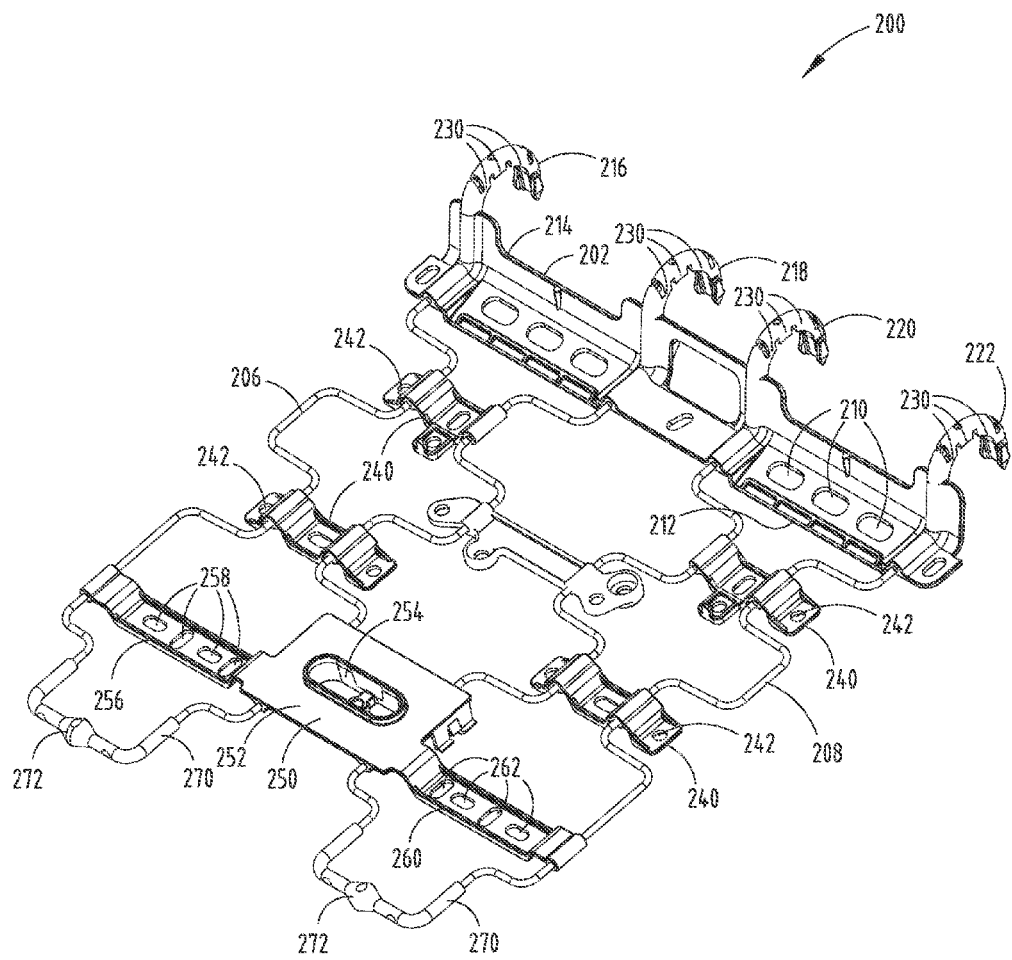
FIG. 12 is a top perspective view of one embodiment of a suspension assembly for a vehicle seating assembly.
Figure 13:
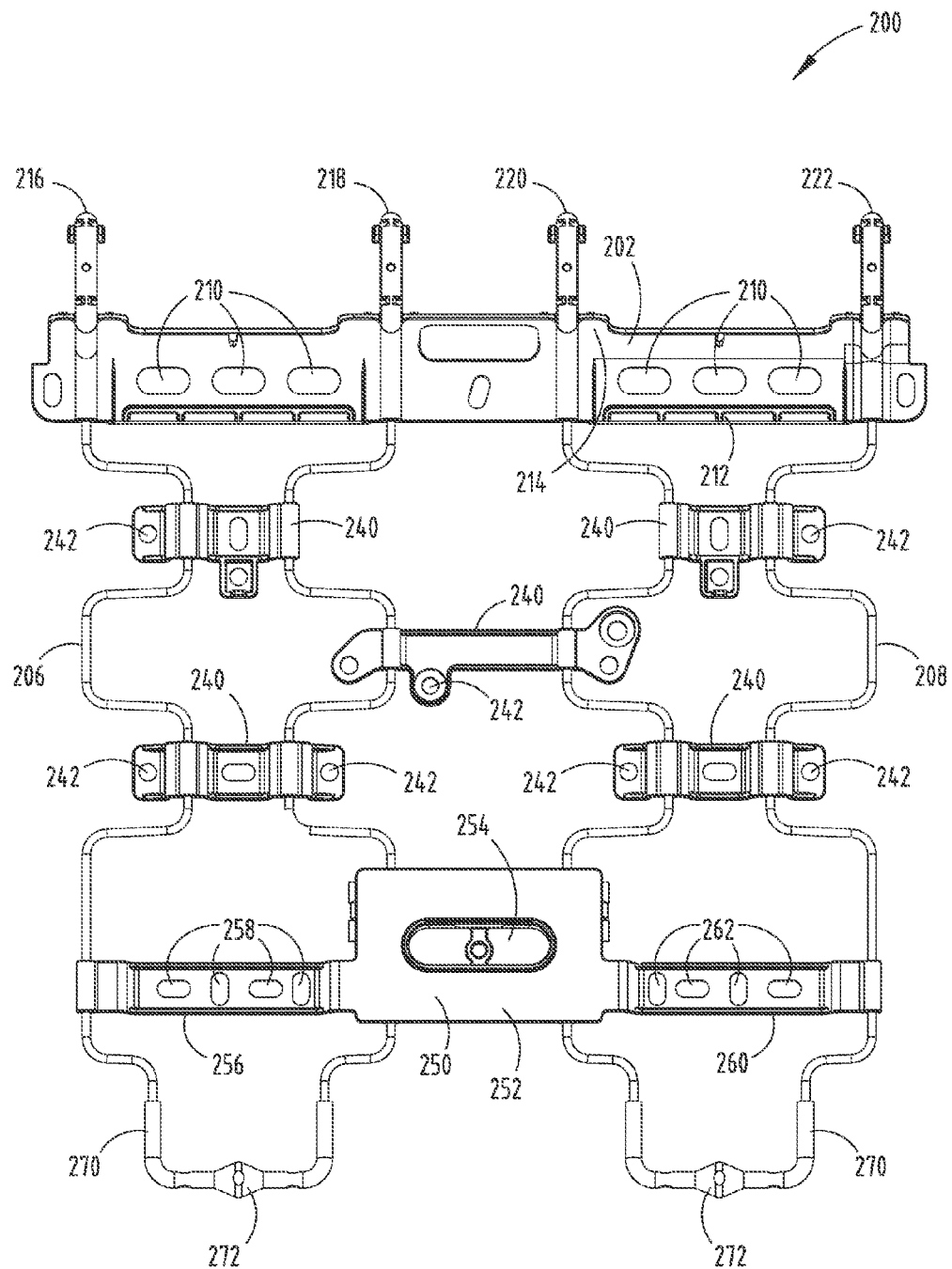
FIG. 13 is a top plan view of the suspension assembly of FIG. 12.
Figure 14:
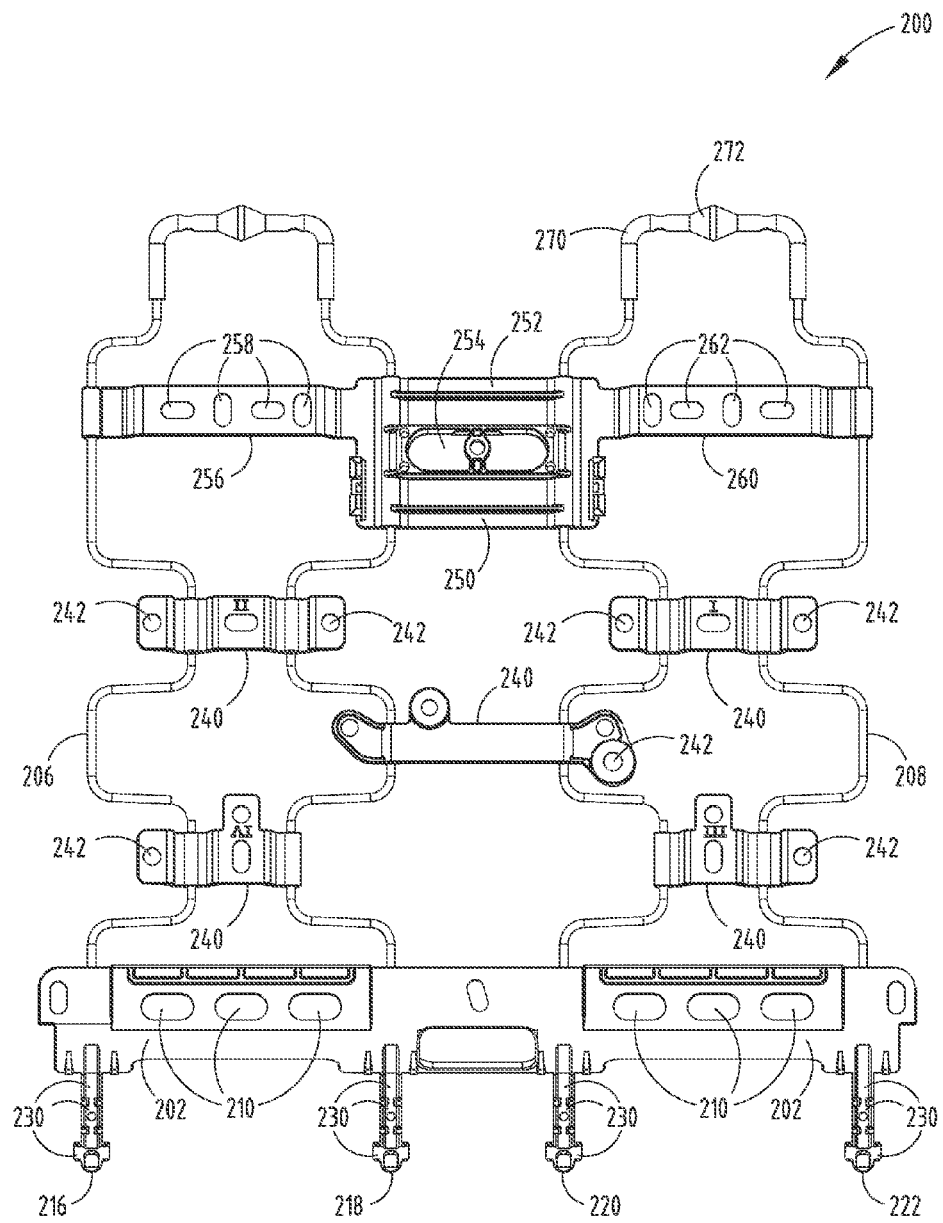
FIG. 14 is a bottom plan view of the suspension assembly of FIG. 12.
Figure 15:
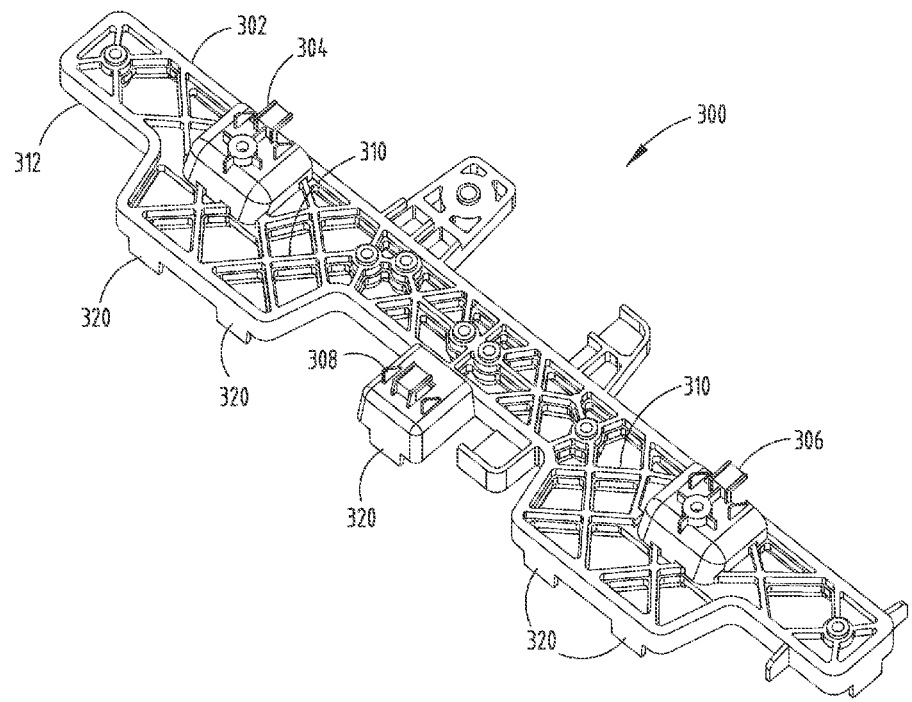
FIG. 15 is a top perspective view of one embodiment of a wire harness of the present invention.
Figure 16:
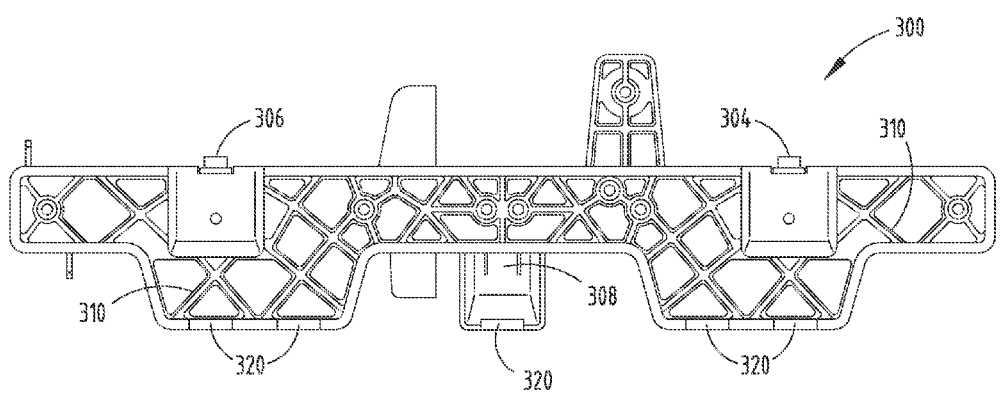
FIG. 16 is a bottom plan view of the wire harness of FIG. 15.

Referring now to FIGS. 12-14, the vehicle seating assembly 10 includes a vehicle seat suspension assembly 200. The suspension assembly 200 includes a rear support 202 for engagement with a torsion tube 204 (FIG. 1) of the vehicle seating assembly 10. The rear support 202 includes a polymeric overmold adapted to engage ends of first and second spring members 206, 208. In addition, the rear support 202 includes a plurality of apertures 210 designed to receive wiring that relay data and power to the vehicle seating assembly 10. The rear support 202 includes a bottom flange 212 with the plurality of apertures 210, as well as a rear vertical flange 214 that provides rigidity to the rear support 202. The rear support 202 also includes first, second, third, and fourth hooks 216, 218, 220, and 222 that are arranged to accommodate the feet of a passenger sitting behind the vehicle seating assembly 10. Thus, the space in between the first hook 216 and the second hook 218 is greater than between the second hook 218 and the third hook 220. However, the space between the first hook 216, the second hook 218, the third hook 220, and the fourth hook 222 is substantially equal.

The hooks 216, 218, 220, 222 of the rear support include load distribution tabs 230 designed to effectively manage the load associated with the weight of a passenger, such that the load spread across each of the hooks 216, 218, 220, 222 is evenly distributed. Accordingly, the loading placed on the torsion tube 204 of the vehicle seating assembly 10 is substantially evenly distributed. The suspension assembly 200 includes rearward and forward trim attachment members 240 on both the first and second spring members 206, 208. The trim attachment members 240 include fastener apertures 242 designed to secure portions of the trim to the suspension assembly 200.

Referring again to FIGS. 12-14, the suspension assembly 200 also includes a cross support 250 that extends across and connects the first and second spring members 206, 208. A center portion 252 of the cross support 250 includes a climate control air supply duct 254 adapted to interface with ductwork that supplies cool or warm air to the cushion of the vehicle seating assembly 10. A first side 256 of the cross support 250 includes a first set of wiring apertures 258 designed to organize and relay data and power wires to attachment locations on the vehicle seating assembly 10. Similarly, a second side 260 of the cross support 250 includes a second set of wiring apertures 262 adapted to relay both power and data wires to attachment locations on the vehicle seating assembly 10. Each wiring aperture 262 includes indicia designating which wires are to extend through each particular aperture 262. A forward portion 270 of each of the first and second spring members 206, 208 includes a polymeric overmold with an arcuate wedge 272 disposed on a midportion thereof. The arcuate wedge 272 is adapted to interface with the complementary arcuate slot 126 on the cushion pan 100. Accordingly, the arcuate wedge 272 and the arcuate slot 126 have complementary constructions that allow for a precise fit that minimizes noise, vibration, and harshness, as well as buzz, squeak, and rattle. Accordingly, mechanical fixation of the suspension assembly to the cushion pan 100 is unnecessary.

The suspension assembly 200 includes robust attachment features, as well as an ideal interface for multi-contour seat hoses, and at the same time provides directional routing. In addition, the directional attachment and interface features related to the wire apertures 258, 262 on the cross support provide robust joint integrity, thereby minimizing the likelihood of dislodging as a result from jounce, ingress/egress, and occupant loading. In addition, the wire apertures 258, 262 include ergonomic insertion efforts, that is, the apertures 258, 262 are elongate and adjacent apertures are arranged such that the longitudinal extent of adjacent apertures are orthogonal to one another.

Figure 17:
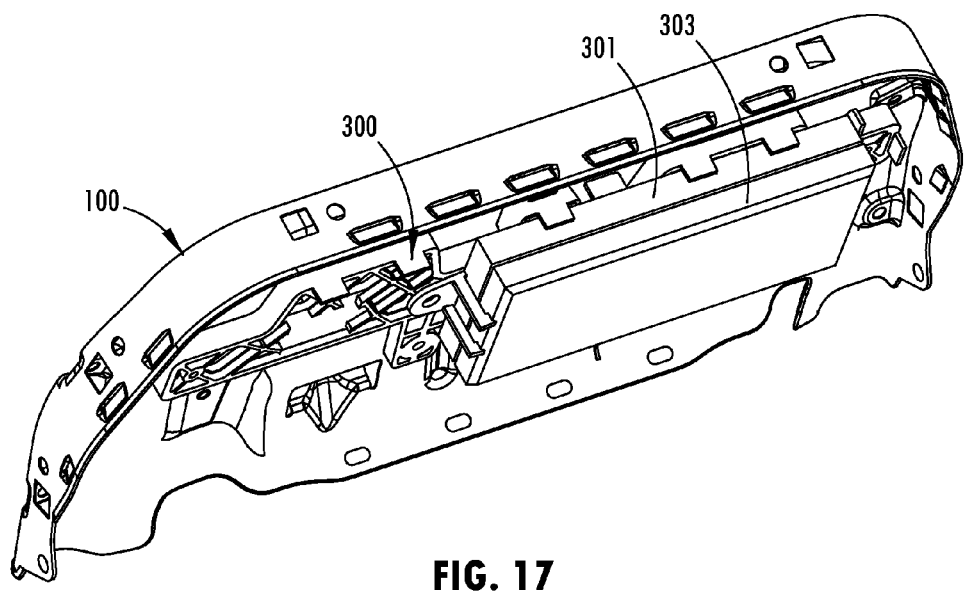
FIG. 17 is a bottom perspective view of one embodiment of the wire harness engaged with a bottom portion of a cushion pan and supporting a module thereon.
Figure 18:
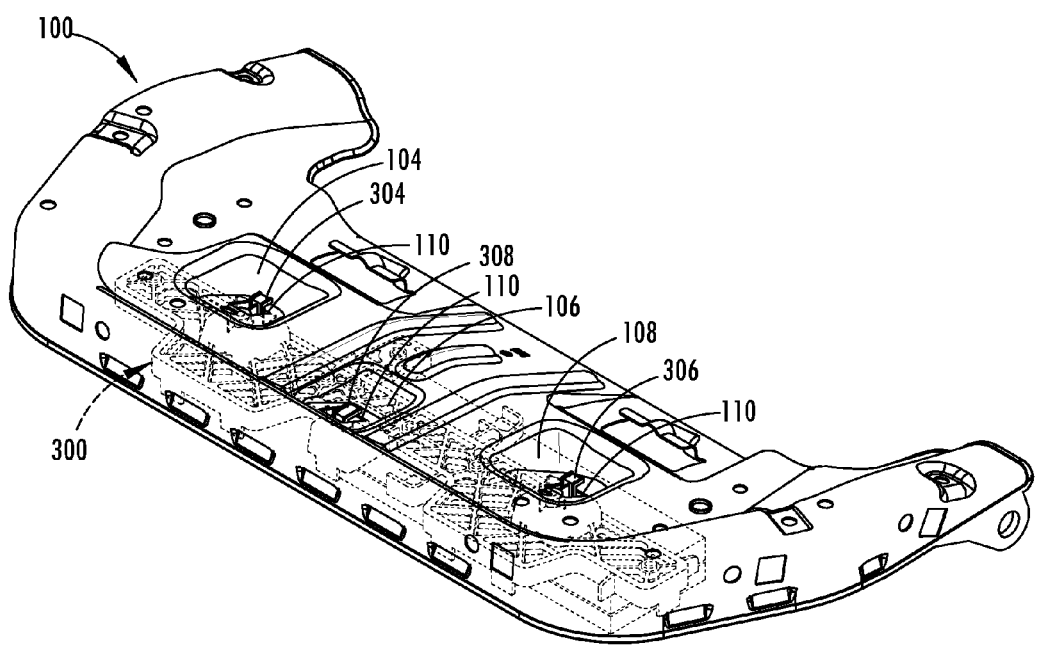
FIG. 18 is a top perspective view of the wire harness engaged with the cushion pan (partially transparent) of FIG. 17.

Referring now to FIGS. 15-18, the illustrated embodiment includes an integrated wiring harness 300 for use on the vehicle seating assembly 10. The integrated wiring harness 300 includes a body portion 302 having a first side hook 304, a second side hook 306, and a center hook 308 for engagement with the cushion pan 100. In addition, a latticework of interconnected lateral support members 310 is disposed inside the body portion 302 and bound by a peripheral frame 312. The integrated wiring harness 300 is adapted for engagement with a variety of modules including memory modules 301, as well as seating position control modules 303. The body portion 302 of the integrated wiring harness 300 is at least partially constructed from a polymer formed from recycled materials. In one embodiment, 30 percent of the body portion 302 is constructed from recycled materials. In addition, the integrated wiring harness 300 includes module engagement tabs 320 that extend downwardly from the body portion 302. The module engagement tabs 320 include a friction fit construction, such that a module may be inserted against the integrated wiring harness 300 and secured in position with a snap fit type construction. The hooks 304, 306, 308 serve as engagement hooks that are generally aligned with the module retention apertures 110 in the cushion pan 100. Accordingly, the integrated wiring harness 300 may be secured against a bottom portion of the cushion pan 100 by engagement of the retention hooks 304, 306, 308 with the module retention apertures 110 in the cushion pan 100. As shown in FIGS. 17 and 18, the engagement hooks secure the integrated wiring harness 300 to the bottom side of the cushion pan 100, which at the same time, secures modules, such as a memory module 301 or a seating position control module 303, to an underside of the vehicle seating assembly 10.

The above descriptions have generally dealt with metallic and polymeric components. However, it will be understood by one having ordinary skill in the art that the metal used to form the described invention and other components is not limited to metallic and polymeric. Other exemplary embodiments of the invention disclosed herein may be formed from metallic and polymeric, or any other suitable material.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A wire harness for a vehicle seating assembly comprising:
    a one-piece body portion including a plurality of upwardly extending engagement hooks that couple the body portion to an underside of a vehicle seat cushion pan that includes pockets with apertures which receive the engagement hooks;
    the body portion defined by a latticework of interconnected lateral support members bound by a peripheral frame; and
    a plurality of module engagement tabs extending downwardly from the peripheral frame.

2. The wire harness of claim 1, further comprising:
    a memory module coupled with the body portion of the wire harness.

3. The wire harness of claim 2, further comprising:
    a seat position control module coupled with the body portion of the wire harness.

4. The wire harness of claim 1, wherein the body portion is constructed from a polymer having approximately 30 percent recycled materials.

5. The wire harness of claim 1, wherein the upwardly extending hooks include a first side hook, a second side hook and a center hook, and wherein in the center hook is disposed forward relative to the first side hook and the second side hook on the wire harness.

6. The wire harness of claim 1, wherein the module engagement tabs include a friction fit construction for snap-fittingly engaging vehicle seating modules.

7. A wire harness for a vehicle seating assembly comprising:
    a one-piece body portion including a latticework of rigid interconnected lateral support members bound by a peripheral frame; engagement tabs extending from the peripheral frame that secure one or more modules; and
    a plurality of engagement hooks extending upwardly from the lateral support members and secured with a vehicle seat cushion pan that has recessed pockets configured to receive the engagement hooks.

8. The wire harness of claim 7, further comprising:
    a memory module coupled with the body portion of the wire harness.

9. The wire harness of claim 7, further comprising:
    a seat position control module coupled with the body portion of the wire harness.

10. The wire harness of claim 7, wherein the body portion is constructed from a polymer having approximately 30 percent recycled materials.

11. The wire harness of claim 7, wherein the module engagement tabs are coupled to a memory module and a seating position control module.

12. A forward support for a vehicle seating assembly comprising:
    a cushion pan having a plurality of pockets with retention apertures and a wiring harness secured against a recessed bottom portion of the cushion pan, the wiring harness including:
        a body portion including a latticework of interconnected lateral support members bound by a peripheral frame;
        a plurality of engagement hooks coupled with the cushion pan and module engagement tabs extending in a direction opposite the engagement hooks.

13. The forward support of claim 12, further comprising:
    a memory module coupled with the body portion of the wire harness.

14. The forward support of claim 12, further comprising:
    a seat position control module coupled with the body portion of the wire harness.

15. The forward support of claim 12, wherein the body portion is constructed from a polymer having approximately 30 percent recycled materials.

16. The forward support of claim 12, wherein the cushion pan includes a peripheral flange that at least partially conceals the wire harness from view.

* * * * *